United States Patent
Ochi et al.

(10) Patent No.: US 11,047,451 B2
(45) Date of Patent: Jun. 29, 2021

(54) TRANSMISSION BELT

(71) Applicant: AISIN AW CO., LTD., Anjo (JP)

(72) Inventors: Akira Ochi, Anjo (JP); Yuki Sato, Nishio (JP); Takayuki Miyake, Anjo (JP); Ryo Nakamura, Anjo (JP); Junichi Tokunaga, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 289 days.

(21) Appl. No.: 16/089,072

(22) PCT Filed: May 18, 2017

(86) PCT No.: PCT/JP2017/018728
§ 371 (c)(1),
(2) Date: Sep. 27, 2018

(87) PCT Pub. No.: WO2017/200057
PCT Pub. Date: Nov. 23, 2017

(65) Prior Publication Data
US 2019/0195315 A1 Jun. 27, 2019

(30) Foreign Application Priority Data

May 18, 2016 (JP) .............................. JP2016-099325

(51) Int. Cl.
*F16G 5/16* (2006.01)
(52) U.S. Cl.
CPC ...................................... *F16G 5/16* (2013.01)
(58) Field of Classification Search
CPC . F16G 5/16; F16G 5/163; F16G 5/166; F16H 9/24; B21D 53/14
(Continued)

(56) References Cited

U.S. PATENT DOCUMENTS 3,720,113 A * 3/1973 Van Doorne et al. .... F16G 5/16
474/242
4,299,586 A * 11/1981 Van der Hardt Aberson ..............
F16G 5/16
474/201
(Continued)

FOREIGN PATENT DOCUMENTS

CN    1279364 A    1/2001
EP    0562654 A1   9/1993
(Continued)

OTHER PUBLICATIONS

Mar. 28, 2019 Search Report issued in European Patent Application No. 17799481.1.
(Continued)

*Primary Examiner* — Henry Y Liu
(74) *Attorney, Agent, or Firm* — Oliff PLC (57) ABSTRACT

A transmission belt is formed by a plurality of elements each having: a body portion including a saddle surface that contacts an inner peripheral surface of an endless ring and a pair of pillar portions that are extended outward in the radial direction of the transmission belt from both lateral sides of the saddle surface; a first surface that is formed on one side of the body portion in the circumferential direction of the transmission belt and a second surface that is formed on the other side of the body portion in the circumferential direction of the transmission belt; and rocking edge portions that are formed at both lateral ends of the first surface so as to be separated from each other and that act as a fulcrum when adjacent ones of the elements contact each other and rotate relative to each other. The rocking edge portions are formed by a curved surface so as to have a width from a position outside the saddle surface to a position inside the saddle surface in the radial direction of the transmission belt. A portion connecting the first surface and the saddle surface is (Continued)

formed so as to be located closer to the second surface than the rocking edge portions are in the circumferential direction of the transmission belt.

5 Claims, 9 Drawing Sheets

(58) Field of Classification Search
USPC .......................................................... 474/242
See application file for complete search history.

(56) References Cited

U.S. PATENT DOCUMENTS

| | | | | |
|---|---|---|---|---|
| 4,371,361 A * | 2/1983 | Giacosa | F16G 5/16 | 474/201 |
| 4,465,469 A * | 8/1984 | Cataldo | F16G 5/16 | 474/201 |
| 4,494,946 A * | 1/1985 | Wilcox | F16G 5/16 | 474/205 |
| 4,525,160 A * | 6/1985 | Okawa | F16G 5/16 | 474/201 |
| 4,655,734 A * | 4/1987 | Okawa | F16G 5/166 | 474/242 |
| 4,676,768 A * | 6/1987 | Miranti, Jr. | F16G 5/16 | 474/201 |
| 4,758,211 A * | 7/1988 | Hattori | F16G 5/16 | 474/201 |
| 4,824,424 A * | 4/1989 | Ide | F16G 5/16 | 474/201 |
| 4,826,473 A * | 5/1989 | Miyawaki | F16G 5/16 | 474/240 |
| 4,854,926 A * | 8/1989 | Hattori | F16G 5/16 | 474/242 |
| 4,891,039 A * | 1/1990 | Hattori | F16G 5/16 | 474/242 |
| 5,004,450 A * | 4/1991 | Ide | F16G 5/16 | 474/242 |
| 5,019,020 A * | 5/1991 | van Lith | F16G 5/16 | 474/240 |
| 5,123,879 A * | 6/1992 | Lecouturier | F16G 5/16 | 474/242 |
| 5,123,880 A * | 6/1992 | Sekine | F16H 9/24 | 474/244 |
| 5,342,251 A * | 8/1994 | Kanehara | G01L 5/102 | 474/242 |
| 5,346,440 A * | 9/1994 | Smeets | F16G 5/16 | 474/242 |
| 6,238,313 B1 * | 5/2001 | Smeets | F16G 5/16 | 474/201 |
| 6,270,437 B1 * | 8/2001 | Yoshida | F16G 5/16 | 474/242 |
| 6,409,620 B1 * | 6/2002 | Yoshida | F16G 5/16 | 474/201 |
| 6,440,023 B2 * | 8/2002 | Kanehara | F16G 5/16 | 474/240 |
| 6,440,025 B1 * | 8/2002 | Ohnuki | F16G 5/16 | 474/242 |
| 6,565,469 B1 * | 5/2003 | Aoyama | F16G 5/16 | 474/240 |
| 6,626,782 B1 * | 9/2003 | Ohsono | B21D 53/14 | 474/201 |
| 6,645,104 B2 * | 11/2003 | Suzuki | B21D 53/14 | 474/201 |
| 6,672,984 B2 * | 1/2004 | Yagasaki | F16G 5/16 | 474/201 |
| 6,705,963 B2 * | 3/2004 | Smeets | F16G 5/16 | 474/201 |
| 7,097,581 B2 * | 8/2006 | Inukai | F16G 5/166 | 474/242 |
| 7,108,624 B2 * | 9/2006 | Smeets | F16G 5/16 | 474/201 |
| 7,963,873 B2 * | 6/2011 | Kobayashi | F16G 5/16 | 474/242 |
| 8,104,159 B2 * | 1/2012 | Hattori | F16G 5/16 | 29/407.05 |
| 8,187,129 B2 * | 5/2012 | Kobayashi | F16G 5/16 | 474/242 |
| 8,337,347 B2 * | 12/2012 | Kobayashi | F16G 5/16 | 474/201 |
| 8,449,419 B2 * | 5/2013 | Morino | F16G 5/16 | 474/245 |
| 8,870,695 B2 * | 10/2014 | Nishimi | F16G 5/16 | 474/242 |
| 2001/0051554 A1 * | 12/2001 | Kanehara | F16G 5/16 | 474/242 |
| 2002/0137585 A1 * | 9/2002 | Smeets | F16G 5/163 | 474/242 |
| 2007/0072721 A1 * | 3/2007 | Takagi | F16G 5/16 | 474/242 |

FOREIGN PATENT DOCUMENTS

| | | |
|---|---|---|
| EP | 1221563 A1 | 7/2002 |
| JP | S59-79653 U | 5/1984 |
| JP | 2000-065153 A | 3/2000 |
| JP | 2002-227936 A | 8/2002 |
| JP | 2006-153089 A | 6/2006 |
| JP | 2009-197935 A | 9/2009 |
| WO | 00/28237 A1 | 5/2000 |
| WO | 2015/063132 A1 | 5/2015 |

OTHER PUBLICATIONS

Aug. 15, 2017 International Search Report issued in International Patent Application No. PCT/JP2017/018728.

* cited by examiner

TRANSMISSION BELT

BACKGROUND

The disclosure of the present disclosure disclosed in the specification relates to transmission belts.

Conventionally, transmission belts, which are wound around pulleys to transmit power and include: elements each having a body portion including a saddle surface, a pair of pillar portions extended radially outward from both right and left sides of the body portion, and a rocking edge portion extending in the lateral direction and acting as a fulcrum when the element contacts an adjacent element and rotates; and a binding ring whose inner peripheral surface contacts the saddle surfaces of the plurality of elements to bind the plurality of elements into a ring shape, are known as this type of transmission belts. For example, Japanese Patent Application Publication No. 2009-197935 discloses a transmission belt in which a rocking edge portion is formed substantially at the same position as a saddle surface in the vertical direction of an element. According to the element described in Japanese Patent Application Publication No. 2009-197935, sliding due to slipping between a binding ring and the saddle surface is restrained and friction loss is reduced, whereby transmission efficiency of the transmission belt is improved.

SUMMARY

Figure 13A:
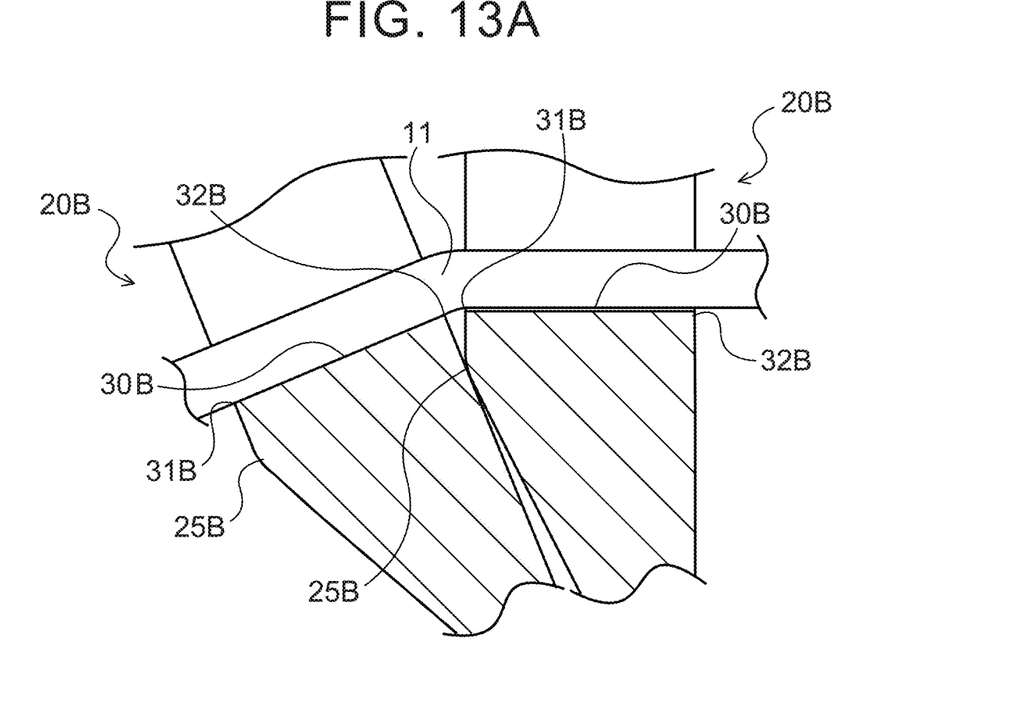
FIG. 13A is an illustration showing how a binding ring is bent by saddle surfaces of two adjacent ones of elements wound around a pulley in the case where a transmission belt is formed by using the elements of a conventional example.
Figure 13B:
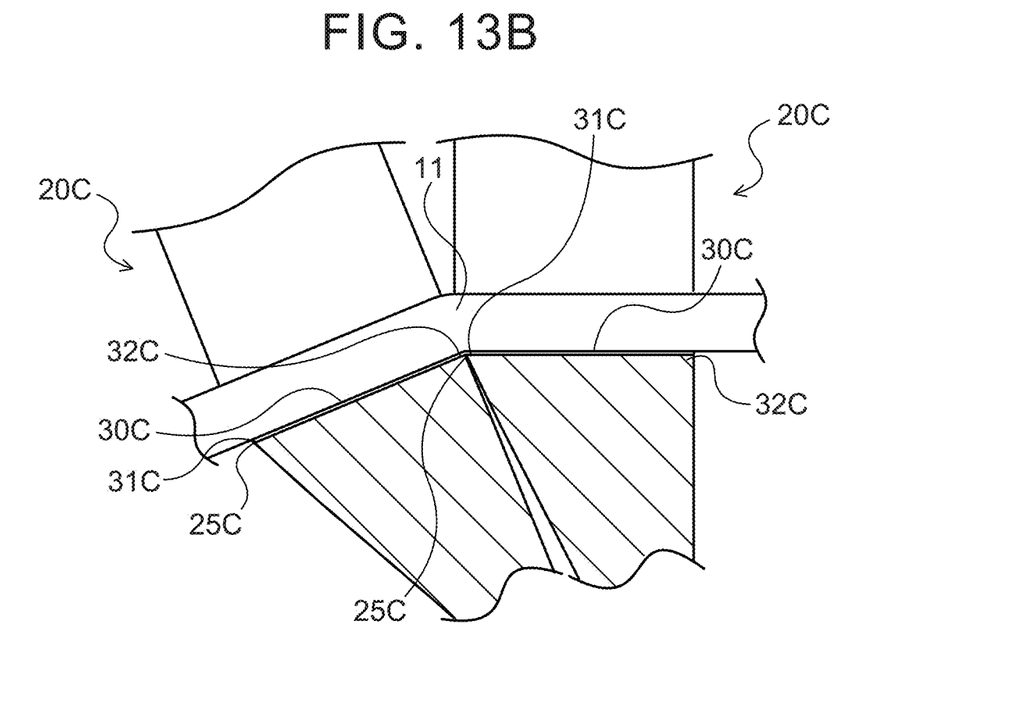
FIG. 13B is an illustration showing how a binding ring is bent by saddle surfaces of two adjacent ones of elements wound around a pulley in the case where a transmission belt is formed by using the elements of a conventional example.

However, the aforementioned transmission belt is disadvantageous in that durability of the binding ring is reduced as the binding ring is subjected to large bending stress. Since the binding ring is subjected to tension with its inner peripheral surface being in contact with the saddle surfaces of the elements, the binding ring is bent according to the slopes of the saddle surfaces of two adjacent ones of the elements wound around a pulley. As shown in FIG. 13A, in the case where a transmission belt is formed by using elements 20B each having a rocking edge portion 25B formed radially inside (below) a saddle surface 30B, two adjacent ones of the elements 20B wound around a pulley have a clearance therebetween in the circumferential direction of the belt at the position of the saddle surfaces 30B. A binding ring 11 therefore has contact sections that contact the saddle surfaces 30B and non-contact sections that do not contact the saddle surfaces 30B due to the clearances in the circumferential direction of the belt, and corners 31B, 32B of the saddle surfaces 30B in the circumferential direction of the belt serve as boundaries between these two types of sections. In this case, since the binding ring 11 is not restrained in each non-contact section, the binding ring 11 is bent with a relatively large radius of curvature in the non-contact section such that the non-contact section is continuous with its adjacent contact sections, and the binding ring 11 is therefore not subjected to large bending stress. As shown in FIG. 13B, however, in the case where a transmission belt is formed by using elements 20C each having a rocking edge portion 25C formed at substantially the same position in the radial direction (the vertical direction) as a saddle surface 30C, two adjacent ones of the elements 20C wound around a pulley have no clearance therebetween in the circumferential direction of the belt at the position of the saddle surfaces 30C. In this case, a binding ring 11 has no non-contact section and is restrained by the saddle surfaces 30C along almost the entire circumferential length of a belt-winding portion of each pulley. The binding ring 11 is therefore bent with a relatively small radius of curvature at an angle formed by the saddle surfaces 30C of two adjacent ones of the elements 20C and is thus subjected to large bending stress. As described above, in the conventional transmission belts, as the position where the rocking edge portion is formed gets closer to the position of the saddle surface, transmission efficiency is improved, but durability of the binding ring is reduced due to larger bending stress that is applied to the binding ring.

A transmission belt of the present disclosure adopts the following measures in order to achieve the aforementioned.

A transmission belt of the present disclosure is a transmission belt that is wound around a primary pulley and a secondary pulley of a continuously variable transmission, including: an endless ring having a ring shape with no ends; and a plurality of elements, each of which has a body including a saddle surface that contacts an inner peripheral surface of the endless ring and a pair of pillars that are extended outward in a radial direction of the transmission belt from both lateral sides of the saddle surface, a first surface that is formed on one side of the body in a circumferential direction of the transmission belt and a second surface that is formed on the other side of the body in the circumferential direction of the transmission belt, and rocking edges that are formed at both lateral ends of the first surface so as to be separated from each other and that act as a fulcrum when adjacent ones of the elements contact each other and rotate relative to each other, the plurality of elements being stacked on each other and supported by the endless ring so as to be arranged in the ring shape, wherein the rocking edges are formed by a curved surface so as to have a width from a position outside the saddle surface to a position inside the saddle surface in the radial direction of the transmission belt, and a portion connecting the first surface and the saddle surface is formed so as to be located closer to the second surface than the rocking edges are in the circumferential direction of the transmission belt.

The transmission belt of the present disclosure is formed by a plurality of elements, each of which has a body including a saddle surface that contacts an inner peripheral surface of an endless ring and a pair of pillars that are extended outward in a radial direction of the transmission belt from both lateral sides of the saddle surface, a first surface that is formed on one side of the body in a circumferential direction of the transmission belt and a second surface that is formed on the other side of the body in the circumferential direction of the transmission belt, and rocking edges that are formed at both lateral ends of the first surface so as to be separated from each other and that act as a fulcrum when adjacent ones of the elements contact each other and rotate relative to each other. The rocking edges are formed by a curved surface so as to have a width from a position outside the saddle surface to a position inside the saddle surface in the radial direction of the transmission belt. A portion connecting the first surface and the saddle surface is formed so as to be located closer to the second surface than a flat surface in the first surface which is located radially outside the rocking edges is in the circumferential direction of the transmission belt. Accordingly, in the transmission belt in which the saddle surface is located within the range of the width of the rocking edges in the radial direction, a clearance (non-contact section) where the inner peripheral surface of the endless ring does not contact the saddle surfaces is provided between the saddle surfaces of two adjacent ones of the elements wound around the pulley. Even when the elements rotate about (contact each other at) any position in the rocking edges, the endless ring is not restrained by the saddle surfaces in the non-contact sections.

This allows the endless ring to be bent with a larger radius of curvature by the saddle surfaces. As a result, the endless ring is subjected to smaller bending stress, which further improves durability of the endless ring.

Another transmission belt of the present disclosure is a transmission belt that is wound around a primary pulley and a secondary pulley of a continuously variable transmission, including: an endless ring having a ring shape with no ends; and a plurality of elements, each of which has a body including a saddle surface that contacts an inner peripheral surface of the endless ring and a pair of pillars that are extended outward in a radial direction of the transmission belt from both lateral sides of the saddle surface, a first surface that is formed on one side of the body in a circumferential direction of the transmission belt and a second surface that is formed on the other side of the body in the circumferential direction of the transmission belt, and rocking edges that are formed at both lateral ends of the first surface so as to be separated from each other and that act as a fulcrum when adjacent ones of the elements contact each other and rotate relative to each other, the plurality of elements being stacked on each other and supported by the endless ring so as to be arranged in the ring shape, wherein the rocking edges are formed by a curved surface so as to have a width from a position outside the saddle surface to a position inside the saddle surface in the radial direction of the transmission belt, and a portion connecting the second surface and the saddle surface is formed so as to be located closer to the first surface than the second surface is in the circumferential direction.

Like the aforementioned transmission belt of the present disclosure, in the another transmission belt of the present disclosure, a clearance (non-contact section) where the inner peripheral surface of the endless ring does not contact the saddle surfaces is provided between the saddle surfaces of two adjacent ones of the elements wound around the pulley. Accordingly, the endless ring is subjected to smaller bending stress, which further improves durability of the endless ring.

DETAILED DESCRIPTION OF EMBODIMENTS

The best modes for carrying out the disclosure will be described based on embodiments.

Figure 1:
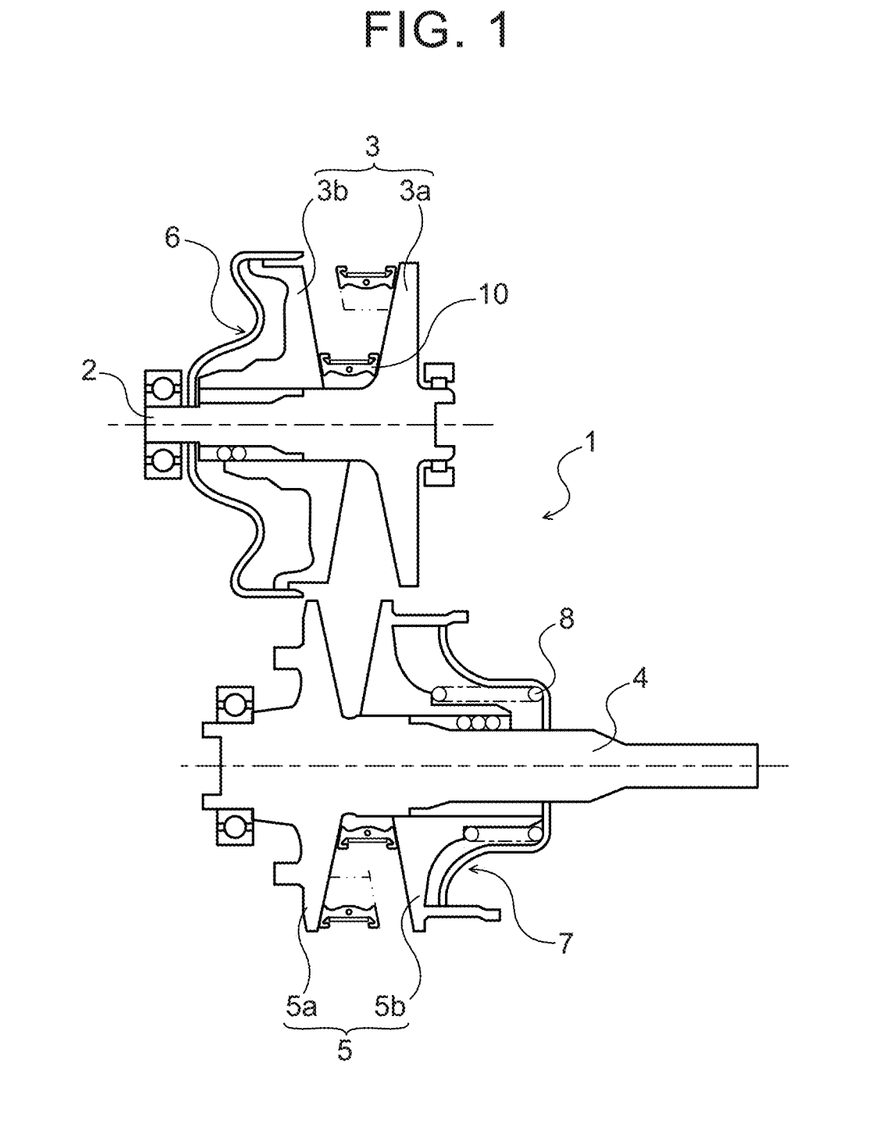
FIG. 1 is a configuration diagram showing the general configuration of a continuously variable transmission including a transmission belt according to an embodiment.

FIG. 1 is a configuration diagram showing the general configuration of a continuously variable transmission 1 including a transmission belt 10 of the present disclosure. The continuously variable transmission 1 is mounted on a vehicle having a power source such as an engine, and as shown in the figure, includes a primary shaft 2 serving as a drive rotary shaft, a primary pulley 3 mounted on the primary shaft 2, a secondary shaft 4 disposed parallel to the primary shaft 2 and serving as a driven rotary shaft, a secondary pulley 5 mounted on the secondary shaft 4, and the transmission belt 10 wound around a pulley groove (V-shaped groove) of the primary pulley 3 and a pulley groove (V-shaped groove) of the secondary pulley 5.

The primary shaft 2 is coupled via a forward-rearward travel switch mechanism, not shown, to an input shaft (not shown) coupled to the power source such as the engine. The primary pulley 3 has a fixed sheave 3a formed integrally with the primary shaft 2 and a movable sheave 3b supported by the primary shaft 2 via a ball spline etc. so as to be slidable in the axial direction. The secondary pulley 5 has a fixed sheave 5a formed integrally with the secondary shaft 4 and a movable sheave 5b supported by the secondary shaft 4 via a ball spline etc. so as to be slidable in the axial direction and biased in the axial direction by a return spring 8.

The continuously variable transmission 1 further has a primary cylinder 6 that is a hydraulic actuator for changing the groove width of the primary pulley 3, and a secondary cylinder 7 that is a hydraulic actuator for changing the groove width of the secondary pulley 5. The primary cylinder 6 is formed behind the movable sheave 3b of the primary pulley 3, and the secondary cylinder 7 is formed behind the movable sheave 5b of the secondary pulley 5. Hydraulic oil is supplied from a hydraulic control device, not shown, to the primary cylinder 6 and the secondary cylinder 7 in order to change the groove widths of the primary pulley 3 and the secondary pulley 5. Torque transmitted from the engine etc. to the primary shaft 2 via the input shaft and the forward-rearward travel switch mechanism can thus be steplessly shifted and output to the secondary shaft 4. The torque thus output to the secondary shaft 4 is transmitted to driving wheels of the vehicle via a gear mechanism (reduction gear), a differential gear, and a drive shaft (all of these components are not shown).

Figure 2:
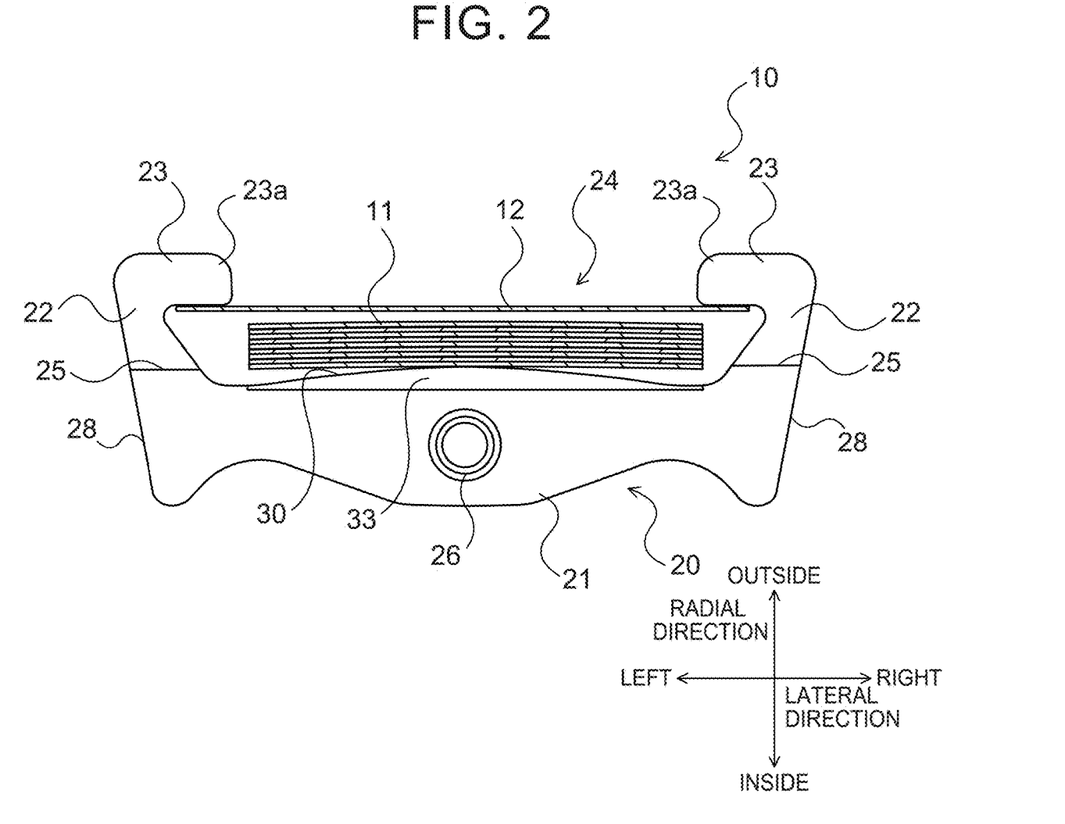
FIG. 2 is a front view of the transmission belt.
Figure 3A:
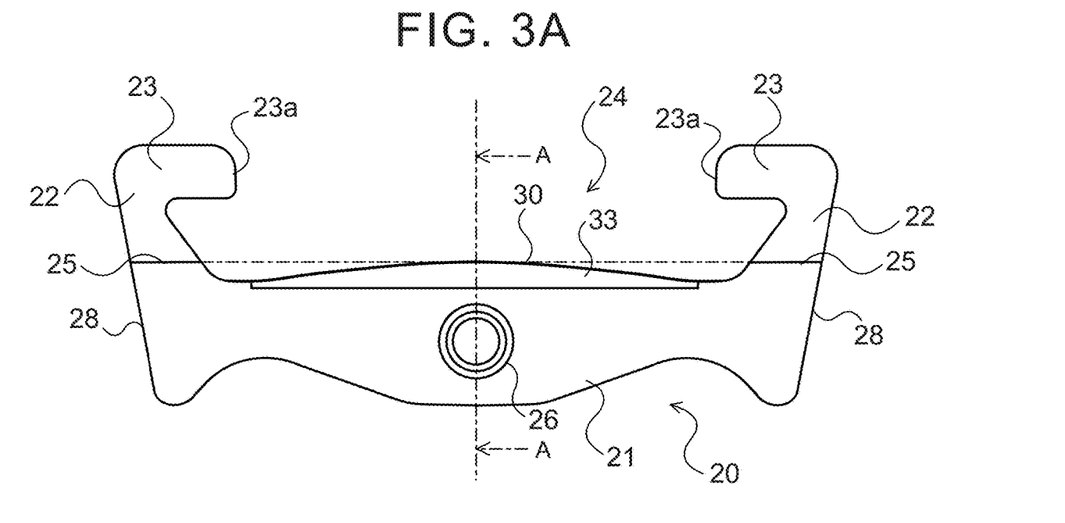
FIG. 3A is a front view of an element.
Figure 3B:
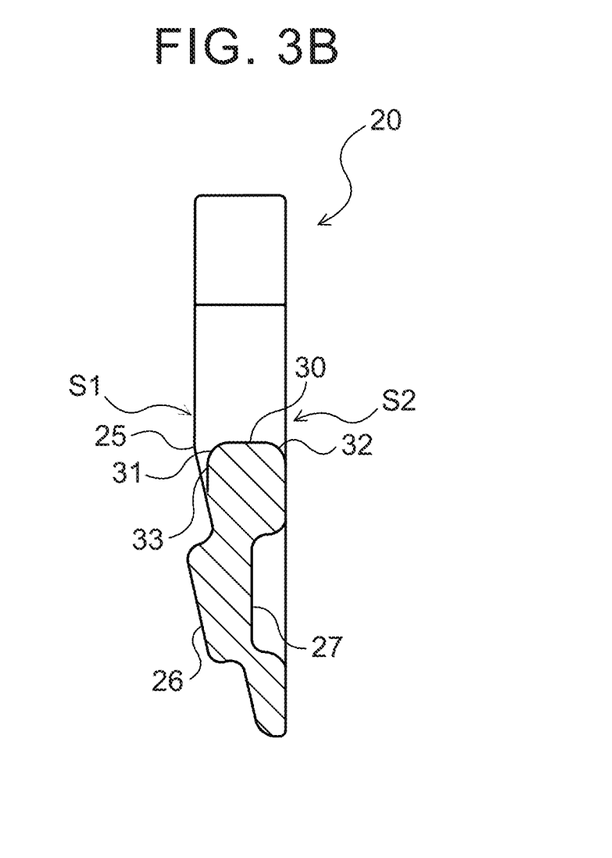
FIG. 3B is a sectional view of the element.

FIG. 2 is a front view of the transmission belt 10, FIG. 3A is a front view of an element 20, and FIG. 3B is a sectional view of the element 20. As shown in FIG. 2, the transmission belt 10 includes a binding ring 11 that is an endless ring and a multiplicity (e.g., several hundreds) of elements 20, and is formed by binding the multiplicity of elements 20 into a ring shape by using the binding ring 11. The transmission belt 10 further includes a retainer ring 12 that retains the binding ring 11 so that the binding ring 11 does not come off from the elements 20.

As shown in FIG. 2, the binding ring 11 is formed by a plurality of (e.g., nine) strip-shaped endless rings (single rings) cut out from a steel sheet drum and stacked in layers from the inside toward the outside in the radial direction. The binding ring 11 has what is called a crowning shape whose top part is its middle part in the lateral direction and which gently slopes downward in the figure from the top part toward the outside in the lateral direction (to the right and left in the figure). As shown in FIG. 2, the retainer ring 12 is formed as a strip-shaped ring cut out from a steel sheet drum and having a larger width and a larger circumference than the binding ring 11, and is disposed radially outside (above in the figure) the binding ring 11.

The element 20 is formed by being punched out from a steel sheet by, e.g., blanking. As shown in FIG. 2, the element 20 has: a body portion 21 including a saddle surface 30 that is contacted by the inner peripheral surface (the inner peripheral surface of the innermost ring disposed at the innermost position in the radial direction) of the binding ring 11 and a pair of right and left pillar portions 22 extended radially outward (upward in the figure) from both lateral end portions (both end portions in the lateral direction in the figure) of the saddle surface 30; and a pair of right and left hook portions 23 extended laterally inward (toward the middle in the figure) from extended end portions of the pair of right and left pillar portions 22. Right and left side surfaces 28 of the element 20 are formed so that the width of the element 20 gradually decreases as it gets farther away from the outside in the radial direction (the upper side in the figure) and closer to the inside in the radial direction (the lower side in the figure), and form torque transmission surfaces (flank surfaces) that contact the V-shaped groove of the primary pulley 3 or the V-shaped groove of the secondary pulley 5 to transmit torque.

As shown in FIGS. 2 and 3A, B, the element 20 has a slot 24 that is a recess formed by a radially outer (upper in the figure) end face (the saddle surface 30) of the body portion 21 and laterally inner end faces of the pair of pillar portions 22 so as to open radially outward (upward in the figure). The binding ring 11 is fitted in the slots 24 to bind the elements 20 into a ring shape. As shown in FIG. 3B, in order to maintain the arrangement of the elements 20, each element 20 has a protruding portion 26 that is formed on its surface (front surface, first surface S1) located on the front side in the direction in which the belt travels when the vehicle moves forward and that protrudes forward, and a loosely fitted portion 27 that is formed on its surface (rear surface, second surface S2) located on the rear side in the direction in which the belt travels when the vehicle moves forward and that is loosely fitted (fitted) on the protruding portion of an adjacent element 20.

The opening width of the slot 24 is reduced by the pair of hook portions 23 extended laterally inward from the extended end portions of the pair of pillar portions 22 which serve as both ends of the slot 24. The opening width of the slot 24 (the distance between tip ends 23a in the direction in which the pair of hook portions 23 are extended) is larger than the width of the binding ring 11 and smaller than the width of the retainer ring 12. The retainer ring 12 thus functions as a retainer for preventing the binding ring 11 from coming off from the slots 24. After the binding ring 11 is fitted in the slots 24, the retainer ring 12 is bent in the lateral direction and fitted in the slots 24. The retainer ring 12 has a long hole (not shown) in the circumferential direction so that the retainer ring 12 can be easily bent in the lateral direction.

As shown in FIGS. 2 and 3A, the saddle surface 30 has a crowning shape whose top part is its middle part in the lateral direction and which gently slopes downward in the figure from the top part toward the outside in the lateral direction. The aforementioned crowning of the binding ring 11 has a larger radius of curvature than the crowning of the saddle surface 30. In order to facilitate understanding, the radius of curvature of the crowning of the saddle surface 30 is exaggerated in the figures.

As shown in FIG. 3B, the element 20 is formed so that the element 20 has a substantially uniform thickness on its radially outer side (upper side in the figure) and becomes gradually thinner as it gets closer to the inside in the radial direction (lower side in the figure). A boundary portion in the front surface (first surface) of the element 20 where the thickness of the element 20 changes is rocking edge portions 25 that contact the rear surface (second surface) of an element 20 in front in the direction in which the belt travels. Each element 20 forming the transmission belt 10 swings (rotates) in the circumferential direction of the belt with the rocking edge portions 25 acting as a fulcrum when the element 20 leaves a belt-winding portion of the primary pulley 3 or the secondary pulley 5 and enters a chord portion between the pulleys and when the element 20 leaves the chord portion and enters the belt-winding portion. For example, the rocking edge portions 25 can be formed by compressing the radially inner side (lower side) of the element in the thickness direction by pressing using a punch having a tapered pressing surface.

In the present embodiment, the rocking edge portions 25 are formed at substantially the same position as the top part of the saddle surface 30 in the radial direction of the element 20 (the vertical direction). Specifically, as shown in FIG. 3B, the rocking edge portions 25 have an arc shape as viewed from the side and contact, in the range of the arc, the rear surface (second surface) of an adjacent element. That is, the rocking edge portions 25 have a width in the radial direction of the element 20 (the vertical direction) and are formed so that the saddle surface 30 is located within the range of the width of the rocking edge portions 25. In other words, the rocking edge portions 25 extend from a position outside (above) the saddle surface 30 in the radial direction of the transmission belt 10 to a position inside (below) the saddle surface 30 in the radial direction of the transmission belt 10. More specifically, the rocking edge portions 25 extend from a position outside (above) an imaginary straight line, which is extended from the saddle surface 30 in the lateral direction of the element 20, in the radial direction of the transmission belt 10, to a position inside (below) the imaginary straight line in the radial direction of the transmission belt 10. As described above, the radius of curvature of the crowning of the binding ring 11 is larger than that of the crowning of the saddle surface 30. Accordingly, when the transmission belt 10 is under low load, namely is subjected to relatively low tension, in the belt-winding portion of the primary pulley 3 or the secondary pulley 5, the inner peripheral surface of the binding ring 11 (the innermost ring) contacts only the top parts of the saddle surfaces 30 in the lateral direction. On the other hand, when the transmission belt 10 is under high load, namely is subjected to relatively high tension, in the belt-winding portion of the primary pulley 3 or the secondary pulley 5, the binding ring 11 is pressed against the saddle surfaces 30 by the tension and thus closely contacts the curved saddle surfaces 30 in the lateral direction. The pressing force (normal force) that is applied from the saddle surface 30 to the binding ring 11 is the largest at the position where the binding ring 11 contacts the top part of the saddle surface 30, and gradually decreases as it gets farther away from the top part of the saddle surface 30 and closer to the outside in the lateral direction. Since the frictional force that is applied to the inner peripheral surface of the binding ring 11 in the circumferential direction is proportional to the normal force that is applied to the binding ring 11, this frictional force is also the largest at the position where the binding ring 11 contacts the top part of the saddle surface 30, and gradually decreases as it gets farther away from the top part of the saddle surface 30 and closer to the outside in the lateral direction. Accordingly, the relative speed difference (slipping) between the top part of the saddle surface 30 and the binding ring 11 is reduced by forming the saddle surface 30 and the rocking edge portions 25 so that the top part of the saddle surface 30 is located within the range of the width of the rocking edge portions 25 in the radial direction of the element 20 (the vertical direction in the figure). As a result, friction loss between the inner peripheral surface of the binding ring 11 and the saddle surface 30 is reduced, and transmission efficiency of the transmission belt 10 is improved.

As shown in FIGS. 2 and 3A, B, two rocking edge portions 25 are formed at both lateral ends (right and left) at the position of the saddle surface 30 so as to be separated from each other. The element 20 has a recess 33 formed in the middle part in the lateral direction of its front surface so as to be recessed in the thickness direction with respect to the rocking edge portions 25. The middle part in the lateral direction of the front surface of the element 20 thus does not contact the rear surface of an adjacent element 20 due to the recess 33. For example, the recess 33 can be formed by pressing the middle part in the lateral direction of the front surface of the element 20 with a punch having a convex pressing surface. Since the recess 33 is formed in the middle part in the lateral direction, the saddle surface 30 has a reduced width in the circumferential direction of the belt due to the recess 33. As shown in FIG. 3A, in the present embodiment, the recess 33 is formed in the same surface of the element 20 as that where the protruding portion 26 is formed, namely the front surface of the element 20 (the surface where the rocking edge portions 25 are formed). In order to prevent contact in the boundary portions between the recess 33 and the rocking edge portions 25, both lateral ends of the recess 33 may be tapered so as to be continuous with the rocking edge portions 25.

The element 20 transmits power by pushing an element in front with the rocking edge portions 25 by the tangential frictional force (tangential force) between the element 20 and the pulley while the pair of side surfaces 28 of the element 20 are being pressed by the pulley. The rocking edge portions 25 thus receive a load corresponding to the tangential force from the element in front. In the element 20 of the present embodiment, since the rocking edge portions 25 are formed at both lateral ends so as to be separated by the recess 33, the element 20 contacts an adjacent element at its both lateral ends and does not receive the load from the element in front in its middle part in the lateral direction. Since the pair of side surfaces 28 of each element 20 are pressed by the pulley (primary pulley 3, secondary pulley 5), each element 20 is subjected to larger moment and deformed to a larger extent as the position where the element 20 receives the load from the element in front gets farther away from the pair of side surfaces 28, namely gets closer to the middle part in the lateral direction. Accordingly, in the present embodiment, the moment force that is applied to each element is reduced, and deformation of each element is restrained.

As shown in FIG. 3B, corners 31, 32 formed at the ends of the saddle surface 30 in the circumferential direction of the belt, namely a corner 31 that is a portion connecting the front surface (first surface S1) of the element 20 and the saddle surface 30 and a corner 32 that is a portion connecting the rear surface (second surface S2) of the element 20 and the saddle surface 30, have a curved surface (rounded surface). The saddle surface 30 other than the rounded surfaces of the corners 31, 32 is therefore a contact surface that contacts the inner peripheral surface of the binding ring 11.

FIGS. 4A to 4D are illustrations showing how a rounded surface is formed at a corner of a saddle surface when forming an element by pressing. As shown in the figures, the element is formed by what is called fine blanking, namely a blanking process in which, with a blank portion of a workpiece W being held between a die D and a pressure pad A, the workpiece W is pressed from both above and below with a punch P and an ejector E to punch out a part (see FIG. 4A, B). In the case where a punch having the tapered pressing surface and the convex pressing surface which are mentioned above is used for fine blanking, the rocking edge portions and the recess can be formed simultaneously as the element is punched out. Rollover resulting from blanking can be used as the curved surface (rounded surface) of one corner 31 of the saddle surface 30 in the circumferential direction of the belt which is formed by blanking (fine blanking). In this case, however, since a burr is formed at the other corner, the curved surface (rounded surface) of the other corner is formed by removing the burr by, e.g., polishing (barrel polishing etc.) (see FIG. 4C, D). The rounded surfaces of the corners 31, 32 may be formed by separately performing pressing, cutting, or polishing after forming the element by blanking.

Figure 4A:
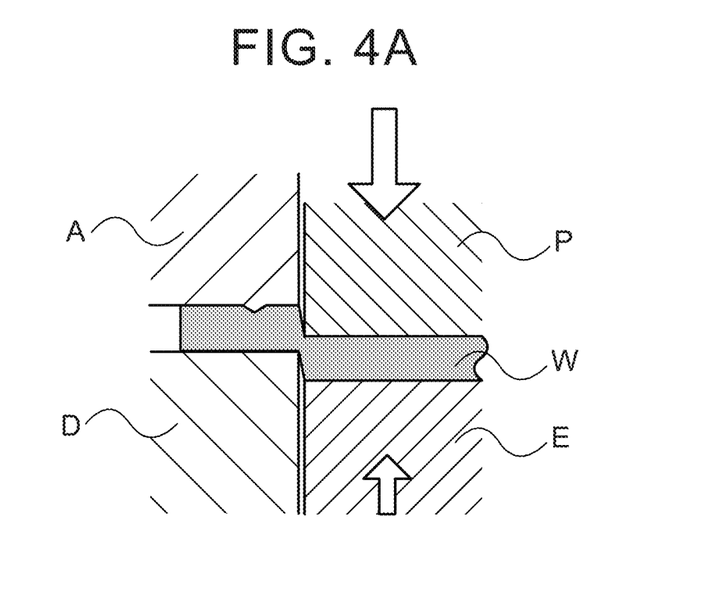
FIG. 4A is an illustration showing how an element is formed by pressing.
Figure 4B:
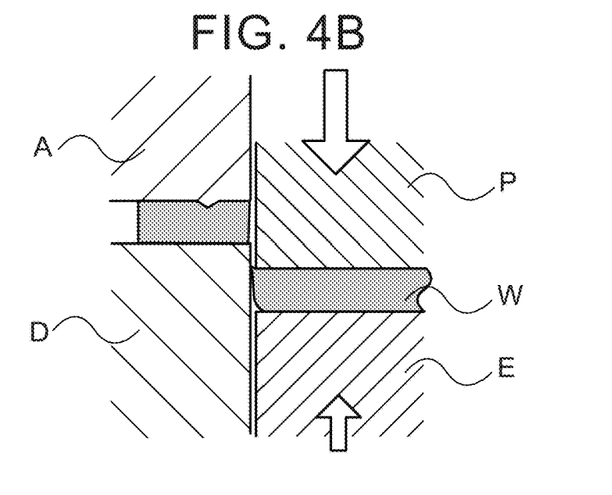
FIG. 4B is an illustration showing how the element is formed by pressing.
Figure 4C:
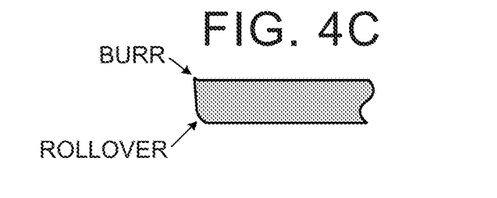
FIG. 4C is an illustration showing the element after pressing.
Figures 4D, 5:
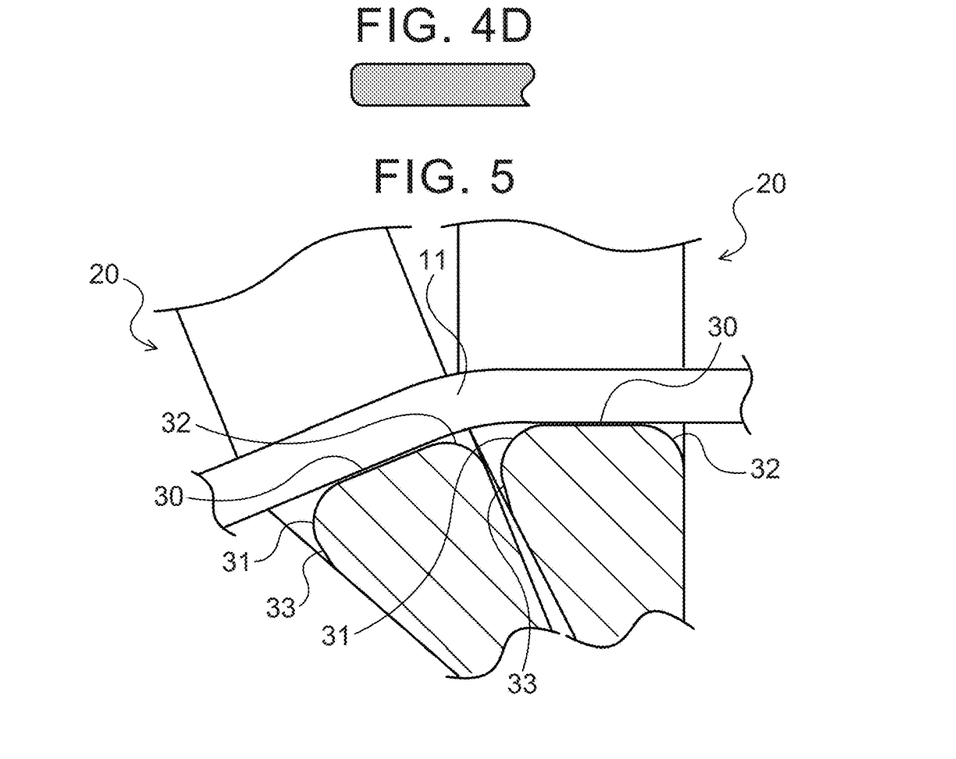
FIG. 4D is an illustration showing the element after polishing.
FIG. 5 is an illustration showing how a binding ring is bent by saddle surfaces of two adjacent ones of the elements wound around a pulley in the case where a transmission belt is formed by the elements of the embodiment.

FIG. 5 is an illustration showing how the binding ring 11 is bent by the saddle surfaces 30 of two adjacent ones of the elements 20 wound around a pulley in the case where a transmission belt is formed by using the elements 20 of the present embodiment. FIGS. 13A, 13B show how the binding ring 11 is bent by the saddle surfaces 30B, 30C of two adjacent ones of the elements 20B, 20C wound around a pulley in the case where transmission belts are formed by using the elements 20B, 20C of the conventional examples. In the elements 20B, 20C of the conventional examples, the corners 31B, 32B, 31C, 32C on both sides of the saddle surfaces 30B, 30C in the circumferential direction of the belt do not have a curved surface, but have an angular shape. An example is considered in which a transmission belt is formed by the elements 20B each having the rocking edge portion 25B formed radially inside (below) the saddle surface 30B, as shown in FIG. 13A. In this case, two adjacent ones of the elements 20C that rotate with the rocking edge portions 25B acting as a fulcrum have clearance therebetween at the position of the saddle surfaces 30B. The binding ring 11 thus has contact sections that contact the saddle surfaces 30B and non-contact sections that do not contact the saddle surfaces 30B due to the clearances, and the corners 31B, 32B of the saddle surfaces 30B in the circumferential direction of the belt serve as boundaries between these two types of sections.

Since the binding ring 11 does not receive a normal force from the saddle surfaces 30B in each non-contact section, the binding ring 11 is bent with a relatively large radius of curvature in the non-contact section such that the non-contact section is continuous with its adjacent contact sections. The binding ring 11 is therefore not subjected to large bending stress. Another example is considered in which a transmission belt is formed by the elements 20C each having the rocking edge portion 25C formed at substantially the same radial (vertical) position as the saddle surface 30C, as shown in FIG. 13B. In this case, two adjacent ones of the elements 20C that rotate with the rocking edge portions 25C acting as a fulcrum do not have clearance therebetween at the position of the saddle surfaces 30C. Accordingly, in the case where the corners 31C, 32C of the saddle surfaces 30C have an angular shape, there is no non-contact section. The binding ring 11 is therefore bent with a small radius of curvature along the angle formed by the two adjacent saddle surfaces 30C and is subjected to large bending stress. On the other hand, in the element 20B of the present embodiment, the corners 31, 32 on both sides of the saddle surface 30 in the circumferential direction of the belt (the portion connecting the front surface of the element 20 and the saddle surface 30 and the portion connecting the rear surface of the element 20 and the saddle surface 30) have a curved surface (rounded surface) and each of the ends of the saddle surface 30 in the circumferential direction of the belt which are formed on the front and rear surface sides is located closer to the other surface than the front or rear surface is. The binding ring 11 therefore does not contact the corners 31, 32 (rounded surfaces). Accordingly, even though the rocking edge portions 25 are formed at substantially the same position as the saddle surface 30, the binding ring 11 has sufficient non-contact sections, which allows the binding ring 11 to be bent with a larger radius of curvature. As a result, the binding ring 11 is subjected to smaller bending stress, which further improves durability of the binding ring 11. Moreover, in the element 20B of the present embodiment, the recess 33 that is recessed in the thickness direction (toward the second surface S2) with respect to the rocking edge portions 25 is formed in a portion connecting the front surface (first surface S1) of the element 20B and the saddle surface 30. The non-contact sections of the binding ring 11 are thus further extended. That is, this allows the binding ring 11 to be bent with an even larger radius of curvature by the normal force (tension) received from the saddle surfaces 30. The binding ring 11 is therefore subjected to even smaller bending stress.

In the transmission belt 10 of the present embodiment described above, the saddle surface 30 of the element 20 which is contacted by the inner peripheral surface of the binding ring 11 is formed so that the corners 31, 32 in the circumferential direction of the belt have a curved surface (rounded surface). Due to the rounded surfaces of the corners 31, 32, the binding ring 11 has sufficient non-contact sections that do not contact the saddle surfaces 30, which allow the binding ring 11 to be bent with a larger radius of curvature by the normal force (tension) received from the saddle surfaces 30. As a result, the binding ring 11 is subjected to smaller bending stress, which further improves durability of the binding ring 11. Since the saddle surface 30 and the rocking edge portions 25 are formed so that the saddle surface 30 is located within the range of the width (arc) of the rocking edge portions 25 in the radial direction of the element 20 (the vertical direction), the relative speed difference (slipping) between the saddle surface 30 and the binding ring 11 is reduced, and transmission efficiency of the transmission belt 10 is improved.

In the transmission belt 10 of the present embodiment, the recess 33 is formed so that the middle part in the lateral direction of the element 20 which connects the front surface (first surface S1) of the element 20 and the saddle surface 30 is thinner than both lateral ends (radially outside the rocking edge portions 25) of the element 20. The saddle surface 30 thus has a reduced width in the circumferential direction of the belt, whereby the non-contact sections of the binding ring 11 are further extended. This allows the binding ring 11 to be bent with an even larger radius of curvature by the normal force (tension) received from the saddle surfaces 30. The binding ring 11 is therefore subjected to even smaller bending stress.

Figure 6:
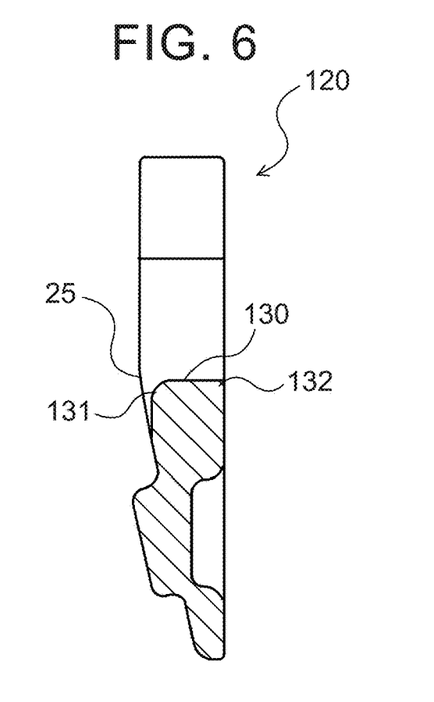
FIG. 6 is an illustration showing an element according to another embodiment.
Figure 7:
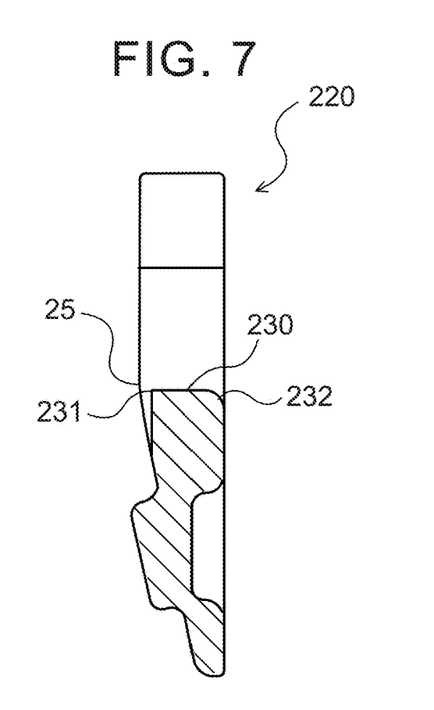
FIG. 7 is an illustration showing an element according to still another embodiment.

In the present embodiment, the corners 31, 32 on both sides of the saddle surface 30 in the circumferential direction of the belt have a curved surface. However, as shown by an element 120 of FIG. 6, a saddle surface 130 may be formed so that a corner 131 located on the same side as the surface where the rocking edge portions 25 are formed (the surface located on the front side in the direction in which the belt travels) has a curved surface and a corner 132 located on the opposite side has an angular shape. Alternatively, as shown by an element 220 of FIG. 7, a saddle surface 230 may be formed so that a corner 231 located on the same side as the surface where the rocking edge portions 25 are formed has an angular shape and a corner 232 located on the opposite side has a curved surface. That is, only one of the corners on both sides of the saddle surface in the circumferential direction of the belt may have a curved surface.

In the present embodiment, the binding ring 11 has a convex surface (crowning shape) that is convexly curved in the lateral direction. However, the binding ring 11 may have a flat surface that is horizontal in the lateral direction.

Figure 8:
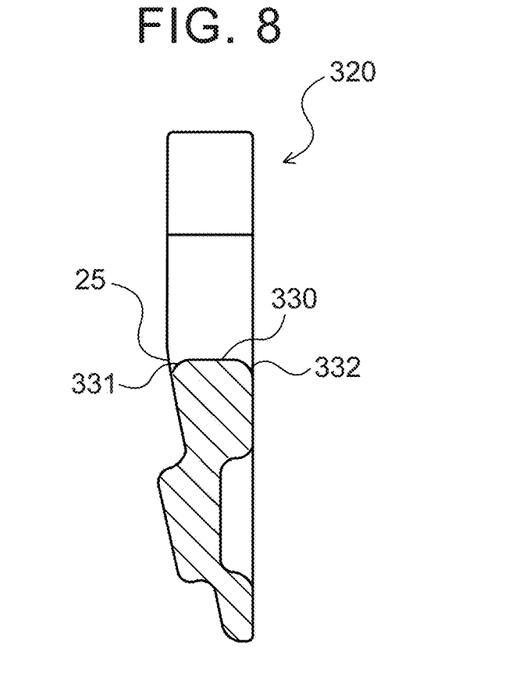
FIG. 8 is an illustration showing an element according to yet another embodiment.

In the present embodiment, the recess 33 is formed in the middle part in the lateral direction of the element 30 which connects the front surface (first surface S1) of the element 30 and the saddle surface 30 so that the middle part in the lateral direction of the element 30 is thinner than both lateral ends (radially outside the rocking edge portions 25) of the element 30. However, the recess may not be formed as shown by an element 320 of FIG. 8. In this case as well, since corners 331, 332 of a saddle surface 330 have a curved surface (rounded surface), the binding ring has non-contact sections that do not contact the saddle surfaces 330. In the present embodiment, the recess 33 is formed in the surface (front surface) of the element 30 which is located on the front side in the direction in which the belt travels. However, the recess may be formed in the surface (rear surface) of the element 30 which is located on the rear side in the direction in which the belt travels, or the recess may be formed in both of the surfaces of the element 30 which are located on the front side and the rear side in the direction in which the belt travels.

Figure 9:
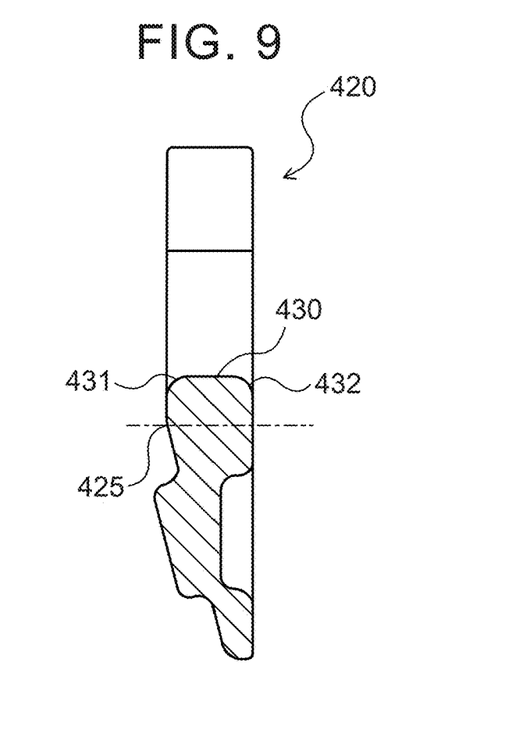
FIG. 9 is an illustration showing an element according to a further embodiment.
Figure 10:
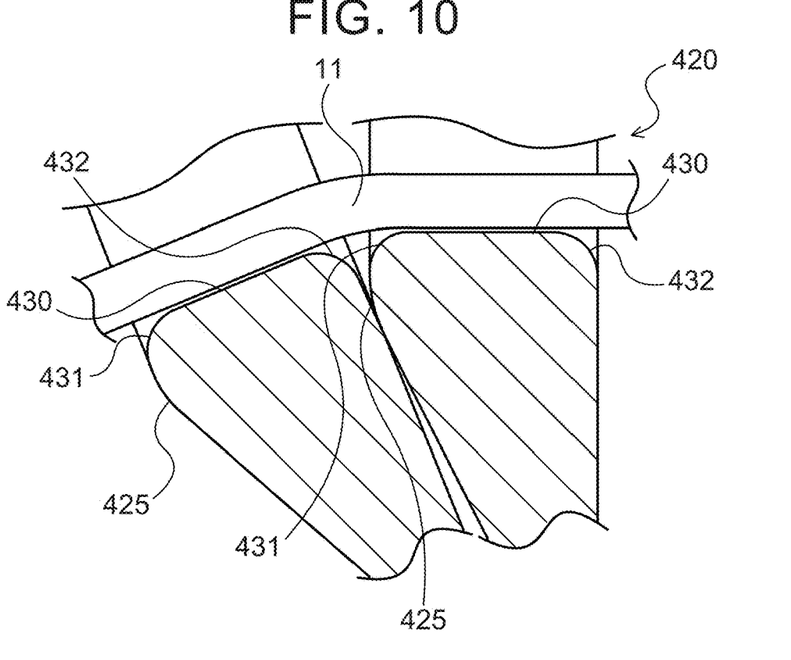
FIG. 10 is an illustration showing how a binding ring is bent by saddle surfaces of two adjacent ones of the elements wound around a pulley in the case where a transmission belt is formed by using the elements according to the further embodiment.

In the present embodiment, the saddle surface 30 and the rocking edge portions 25 are formed at such positions that the top part of the saddle surface 30 is located within the range of the width of the rocking edge portions 25 in the radial direction of the element 20 (the vertical direction). However, the rocking edge portions may be formed at a position different from that of the top part of the saddle surface. For example, as shown by an element 420 of FIG. 9, a saddle surface 430 and rocking edge portions 425 may be formed at such positions that the top part of the saddle surface 430 is located at a position radially inside (below) the range of the width of the rocking edge portions 25. In this case, transmission efficiency of the transmission belt is reduced. However, as shown in FIG. 10, two adjacent ones of elements wound around a pulley have larger clearance therebetween near the position of the saddle surface 430. The non-contact sections of the binding ring are therefore further extended, which allows the binding ring to be bent with an even larger radius of curvature. The binding ring is therefore subjected to even smaller bending stress, which further improves durability of the binding ring.

Figure 11:
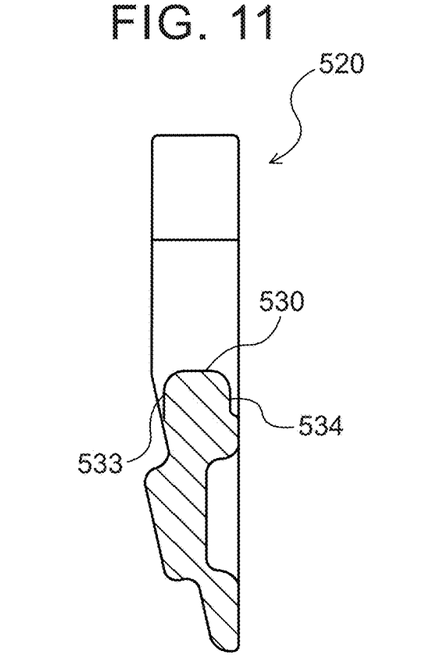
FIG. 11 is an illustration showing an element according to a still further embodiment.

In the present embodiment, the recess 33 that is recessed in the thickness direction (toward the second surface) is formed only in the portion connecting the front surface of the element 20 (the surface where the rocking edge portions 25 are formed, the first surface S1) and the saddle surface 30. As shown by an element 520 of FIG. 11, however, a recess 533 that is recessed in the thickness direction (toward the second surface S2 opposite to the first surface S1) may be formed in a portion connecting the front surface (first surface S1) of the element 520 and a saddle surface 530 and a recess 534 that is recessed in the thickness direction (toward the first surface S1) may be formed in a portion connecting the rear surface (second surface S2) of the element 520 and the saddle surface 530. Alternatively, a recess that is recessed in the thickness direction (toward the first surface S1) may be formed only in the portion connecting the rear surface (second surface S2) of the element and the saddle surface.

Figure 12:
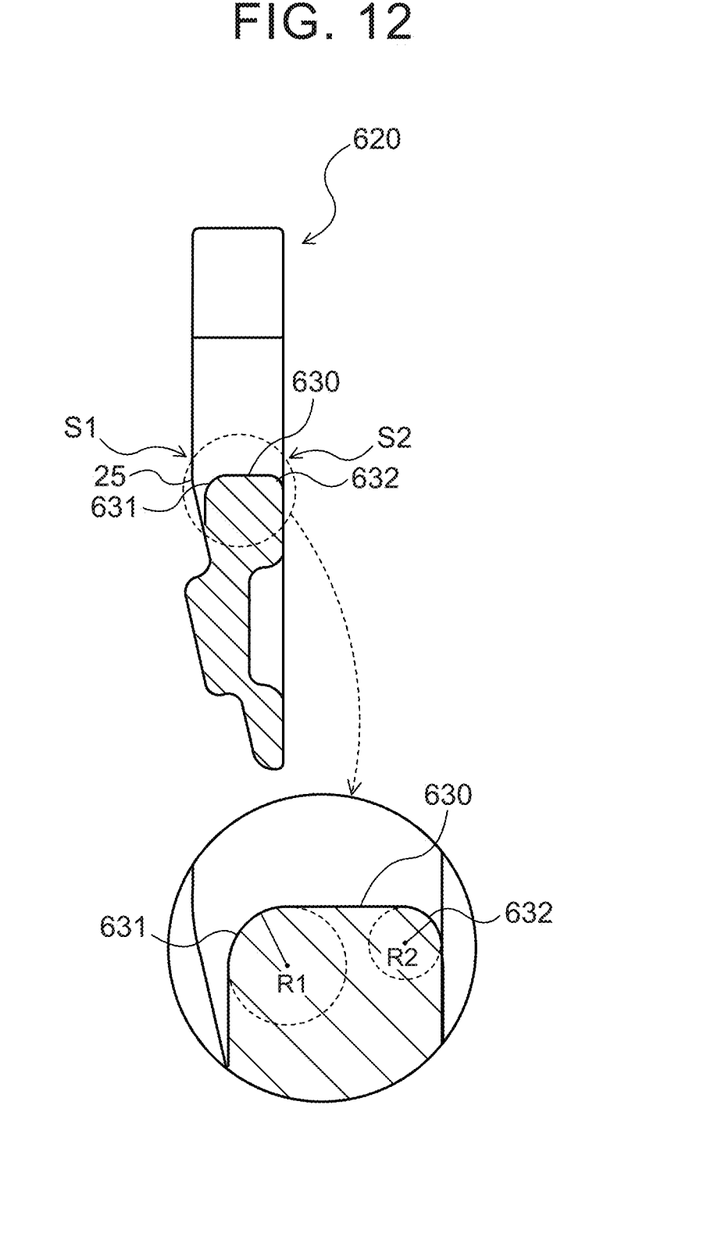
FIG. 12 is an illustration showing an element according to a yet further embodiment.

In the present embodiment, the corners 31, 32 on both sides of the saddle surface 30 in the circumferential direction of the belt have a convex surface that is curved in the circumferential direction of the belt. As shown by an element 620 of FIG. 12, however, the radius of curvature R1 of a corner 631 located on the side (the first surface S1 side) of a saddle surface 630 where rocking edge portions 25 are formed may be larger than the radius of curvature R2 of a corner 632 located on the opposite side (the second surface S2 side) of the saddle surface 630. For example, the radius of curvature R1 and the radius of curvature R2 may be set so that the radius of curvature R1 is larger than the radius of curvature R2 by causing the radius of curvature R1 and the radius of curvature R2 to have similar nominal values and making the tolerance of the radius of curvature R2 smaller than that of the radius of curvature R1.

As described above, the transmission belt of the present disclosure is a transmission belt (10) that is wound around a primary pulley (3) and a secondary pulley (5) of a continuously variable transmission (1), including: an endless ring (11) having a ring shape with no ends; and a plurality of elements (20, 120, 220, 320, 420, 520, 620), each of which has a body portion (21) including a saddle surface (30, 130, 230, 330, 430) that contacts an inner peripheral surface of the endless ring (11) and a pair of pillar portions (22) that are extended outward in a radial direction of the transmission belt (10) from both lateral sides of the saddle surface (30, 130, 230, 330, 430), a first surface (S1) that is formed on one side of the body portion (21) in a circumferential direction of the transmission belt (10) and a second surface (S2) that is formed on the other side of the body portion (21) in the circumferential direction of the transmission belt (10), and rocking edge portions (25) that are formed at both lateral ends of the first surface (S1) so as to be separated from each other and that act as a fulcrum when adjacent ones of the elements (20, 120, 220, 320, 420, 520, 620) contact each other and rotate relative to each other, the plurality of elements (20, 120, 220, 320, 420, 520, 620) being stacked on each other and supported by the endless ring (11) so as to be arranged in the ring shape, wherein the rocking edge portions (25) are formed by a curved surface so as to have a width from a position outside the saddle surface (30, 130, 230, 330, 430, 530, 630) to a position inside the saddle surface (30, 130, 230, 330, 430, 530, 630) in the radial direction of the transmission belt (10), and a portion connecting the first surface (S1) and the saddle surface (30, 130, 230, 330, 430, 530, 630) is formed so as to be located closer to the second surface (S2) than the flat surface is in the circumferential direction of the transmission belt (10).

That is, the transmission belt is formed by a plurality of elements, each of which has a body portion including a saddle surface that contacts an inner peripheral surface of an endless ring and a pair of pillar portions that are extended outward in a radial direction of the transmission belt from both lateral sides of the saddle surface, a first surface that is formed on one side of the body portion in a circumferential direction of the transmission belt and a second surface that is formed on the other side of the body portion in the circumferential direction of the transmission belt, and rocking edge portions that are formed at both lateral ends of the first surface so as to be separated from each other and that act as a fulcrum when adjacent ones of the elements contact each other and rotate relative to each other. The rocking edge portions are formed by a curved surface so as to have a width from a position outside the saddle surface to a position inside the saddle surface in the radial direction of the transmission belt. A portion connecting the first surface and the saddle surface is formed so as to be located closer to the second surface than a flat surface in the first surface which is located radially outside the rocking edge portions is in the circumferential direction of the transmission belt. Accordingly, in the transmission belt in which the saddle surface is located within the range of the width of the rocking edge portions in the radial direction, a clearance (non-contact section) where the inner peripheral surface of the endless ring does not contact the saddle surfaces is provided between the saddle surfaces of two adjacent ones of the elements wound around the pulley. Even when the elements rotate about (contact each other at) any position in the rocking edge portions, the endless ring is not restrained by the saddle surfaces in the non-contact sections. This allows the endless ring to be bent with a larger radius of curvature by the saddle surfaces. As a result, the endless ring is subjected to smaller bending stress, which further improves durability of the endless ring.

In the transmission belt of the present disclosure, a portion connecting the second surface (S2) and the saddle surface (530) may be formed so as to be located closer to the first surface (S1) than the second surface (S2) is in the circumferential direction. In this case, the non-contact sections where the inner peripheral surface of the endless ring does not contact the saddle surfaces are further extended. This allows the endless ring to be bent with an even larger radius of curvature by the saddle surfaces. The endless ring is therefore subjected to even smaller bending stress.

In the transmission belt of the present disclosure, the portion connecting the first surface (S1) and the saddle surface (30, 130, 430, 630) may be a convex surface (31, 131, 431, 631) that is convexly curved in the circumferential direction. The non-contact sections where the inner peripheral surface of the endless ring does not contact the saddle surfaces are thus secured by the convex surface. In this case, the portion connecting the second surface (S2) and the saddle surface (30, 430, 630) may be a convex surface (32, 432, 632) that is convexly curved in the circumferential direction. Moreover, in this case, the convex surface (631) of the portion connecting the first surface (S1) and the saddle surface (630) may have a larger radius of curvature than the convex surface (632) of the portion connecting the second surface (S2) and the saddle surface (630).

Moreover, in the transmission belt of the present disclosure, the rocking edge portions (25) may be formed in a surface located on a front side in a direction in which the transmission belt (10) travels when a vehicle moves forward.

In the transmission belt of the present disclosure, the first surface (S1) may have a recess (33) formed in its middle part in a lateral direction so as to be recessed toward the second surface with respect to the rocking edge portions (25), and the rocking edge portions (25) may be formed at both lateral ends of the recess (33) so as to be separated from each other. In this case, the non-contact sections of the endless ring (11) are extended by an amount corresponding to the depth of the recess (33). This allows the endless ring (11) to be bent with an even larger radius of curvature. The endless ring (11) is therefore subjected to even smaller bending stress, which further improves durability of the endless ring (11).

In the transmission belt of the present disclosure, the saddle surface (30) may be formed by a convex surface that is convexly curved outward in the lateral direction of the element (20), and a top part of the convex surface of the saddle surface (30) may be formed so as to be located within a range of the width of the rocking edge portions (25) in the radial direction. In the case where the saddle surface (30) is formed by a convex surface, a normal force that is applied from the saddle surface (30) of the element (20) wound around the pulley (3, 5) to the endless ring (11) is the largest at the top part of the convex surface. Accordingly, a frictional force between the saddle surface (30) and the inner peripheral surface of the endless ring (11) is also the largest at the top part of the convex surface. Therefore, if the endless ring (11) slips on the top part of the saddle surface (30), large friction loss is caused, which results in reduced transmission efficiency of the transmission belt. However, since the top part of the convex surface of the saddle surface (30) is located within the range of the width of the rocking edge portions (25) in the radial direction, slipping between the top part of the saddle surface (30) and the endless ring (11) is reduced. As a result, transmission efficiency of the transmission belt is further improved.

Although the embodiments of the disclosure of the present disclosure are described above, it is to be understood that the disclosure of the present disclosure is not limited to the embodiments and can be embodied in various forms without departing from the spirit and scope of the disclosure of the present disclosure.

INDUSTRIAL APPLICABILITY

The disclosure of the present disclosure can be used in the manufacturing industries of continuously variable transmissions and transmission belts, etc.

The invention claimed is:

1. A transmission belt that is wound around a primary pulley and a secondary pulley of a continuously variable transmission, the transmission belt comprising:
   an endless ring having a ring shape with no ends; and
   a plurality of elements, each of which has:
      a body including a saddle surface that contacts an inner peripheral surface of the endless ring and a pair of pillars that are extended outward in a radial direction of the transmission belt from both lateral sides of the saddle surface,
      a first surface that is formed on one side of the body in a circumferential direction of the transmission belt and a second surface that is formed on the other side of the body in the circumferential direction of the transmission belt, and
      rocking edges that are formed at both lateral ends of the first surface so as to be separated from each other and that act as a fulcrum when adjacent ones of the elements contact each other and rotate relative to each other, the plurality of elements being stacked on each other and supported by the endless ring so as to be arranged in the ring shape, wherein
   the rocking edges are formed by a curved surface so as to have a width from a position outside the saddle surface to a position inside the saddle surface in the radial direction of the transmission belt,
   a portion connecting the first surface and the saddle surface is formed so as to be located closer to the second surface than the rocking edges are in the circumferential direction of the transmission belt,
   a portion connecting the second surface and the saddle surface is formed so as to be located closer to the first surface than the second surface is in the circumferential direction,
   the portion connecting the first surface and the saddle surface is a convex surface that is convexly curved in the circumferential direction,
   the portion connecting the second surface and the saddle surface is a convex surface that is convexly curved in the circumferential direction,
   the convex surface of the portion connecting the first surface and the saddle surface has a larger radius of curvature than the convex surface of the portion connecting the second surface and the saddle surface, and
   the rocking edges are formed in a surface located on a front side in a direction in which the transmission belt travels when a vehicle moves forward.

2. The transmission belt according to claim 1, wherein
the first surface has a recess formed in a middle part in a lateral direction so as to be recessed toward the second surface with respect to the rocking edges, and
the rocking edges are formed at both lateral ends of the recess so as to be separated from each other.

3. The transmission belt according to claim 2, wherein
the saddle surface is formed by a convex surface that is convexly curved outward in the lateral direction of the element, and
a top part of the convex surface of the saddle surface is formed so as to be located within a range of the width of the rocking edges in the radial direction.

4. The transmission belt according to claim 1, wherein
the saddle surface is formed by a convex surface that is convexly curved outward in the lateral direction of the element, and
a top part of the convex surface of the saddle surface is formed so as to be located within a range of the width of the rocking edges in the radial direction.

5. The transmission belt according to claim 1, wherein
the convex surface of the portion connecting the first surface and the saddle surface is on a radially outer side and laterally overlaps a protruding portion on the first surface.

* * * * *